May 22, 1951 R. A. HARTMAN 2,553,917
FASTENING DEVICE
Filed Oct. 21, 1946

Inventor:
Richard A. Hartman
By H. G. Lombard
Attorney

Patented May 22, 1951

2,553,917

UNITED STATES PATENT OFFICE 2,553,917

FASTENING DEVICE

Richard A. Hartman, Cleveland, Ohio, assignor to Tinnerman Products, Inc., Cleveland, Ohio, a corporation of Ohio Application October 21, 1946, Serial No. 704,732

2 Claims. (Cl. 85—5)

This invention relates to improvements in fasteners of the type employed in installations in which a relatively long shank is required to provide a securing action at any one of several points spaced a substantial distance from the head of the fastener. More particularly, the invention deals with an improved snap stud fastener having a relatively long shank provided with positive holding means adapted to be easily and quickly sprung into applied fastening position and to secure the fastener at any one of several locations along the shank thereof in locking engagement in an opening in a panel or other support.

A snap stud fastener of this character has a wide range and variety of uses and one important application thereof has to do with the securing of a padding or layer of insulation material to the dash of an automobile or a similar part of a housing, cabinet, or the like. Often such an insulation pad is quite thick in order to prevent the passage of objectionable heat, odor, and annoying sounds from the motor to the interior of the car body and consequently, a fastener having a relatively long shank is required. The pad is usually concealed by a finish covering of trim material secured therewith to the dash by the forward ends of the fasteners projecting into the area in which the motor is located under the hood of the automobile and, in this relation, it is especially desirable that the projecting shank portions of the fasteners be as short as possible in order to eliminate possible tangling of ignition wires, etc., therewith, and otherwise to minimize possibility of the fasteners becoming accidentally dislodged or displaced from applied fastening position by one having occasion to work under the hood of the automobile.

Many types of snap stud fasteners are provided by a relatively extensive progressive die drawing operation which often is impractical in the case of a fastener requiring a comparatively long shank inasmuch as such a shank cannot be drawn or pressed from ordinary sheet metal to the required length without the use of special, expensive equipment which makes the cost of such fasteners prohibitive.

A primary object of the invention, therefore, is to provide an improved snap stud fastener of the kind described, which is made from standard sheet metal strip stock by simple punching and bending operations and in a highly simplified design in which the shank may be of desired length and with the securing means thereon in proximity to the point or leading end of the fastener such that in an installation there is presented a relatively short projecting shank portion for the aforesaid purposes.

Another object of the invention is to provide such a snap stud fastener in which the shank comprises a return bent section of strip material defining a load carrying shank member which secures the parts of an installation and a cooperating resilient shank member which maintains the load carrying shank member in secured relation under continuously effective spring tension.

A further object of the invention is to provide a snap stud fastener of this character in which the shank of the fastener is designed for securing installations of different thicknesses.

Another object of the invention is for the provision of a snap stud fastener having all the foregoing advantages and features of construction and which is strong, durable and reliable and adapted for economical quantity production at relatively low cost.

With the foregoing and other objects in view, further objects and advantages and other new and useful features in the construction, arrangement and general combination of parts of the invention will be readily apparent as the following description proceeds with reference to the accompanying drawings, for purposes of illustration but not of limitation, in which like reference characters designate like parts throughout the same, and in which.

Figure 1:
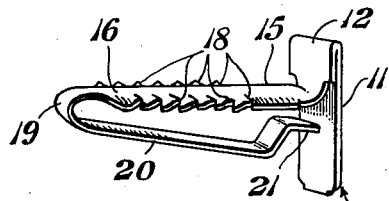
Fig. 1 is a perspective view of the improved snap stud fastener of the invention.
Figure 2:
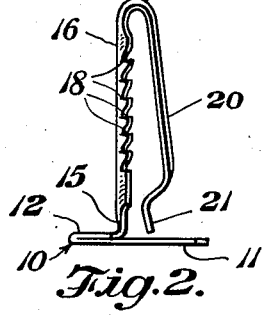
Fig. 2 is an edge elevational view of the snap stud fastener.
Figure 3:
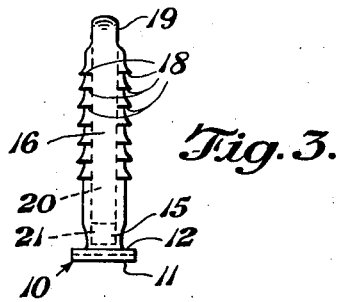
Fig. 3 is a side elevational view of the fastener as seen from the left of Fig. 2.

Referring now more particularly to the drawings, Figs. 1–3 inclusive show a preferred form of the improved snap stud fastener and Figs. 4–7 show the relation in which it is used on being applied to fastening engagement in an aperture in a supporting wall such as an automobile dash panel constructed of any suitable material such as sheet metal, wood, fibre board, or the like, etc. A fragment of the supporting wall is designated generally A, and inasmuch as the present invention is usually employed in metallic structures, such supporting wall usually is in the form of a metallic panel or plate-like element which is provided with perforations at regular intervals and at suitably spaced points along which the trim material or insulation pad extends in mounted position. Such perforations may be either round, rectangular, or of any other suitable outline but generally are provided in the manner of circular openings 1 which involve the least cost inasmuch as only the simplest punching or drilling tools are required.

Adjacent the panel A there is provided a layer of insulation B formed of any selected material such as cork, jute, hair, etc., or a combination of any such suitably held together in a relatively thick substantial pad which is usually soft and flexible and may be readily compressed in the application of the snap studs to fastening position. The insulation pad is perforated in any suitable manner to receive the shank of the fastener applied to the opening 1 in the supporting wall or dash panel A, and a covering of trim material C made of cardboard, fibre board, or the like, and having a stud passage 5, is secured over the insulation pad to provide a neat, finished appearance to the interior of the car body or other structure.

The snap stud fastener designated generally 10, is made in a highly simplified design from a small, inexpensive strip of any suitable sheet metal, preferably of a spring metal nature such as spring steel or cold rolled steel having spring characteristics. One end of the strip defines a generally flat head member 11 which, of course, may be of any desired length. A return bent portion 12 extends in underlying relation to the head member and carries a strip portion 15 generally normal thereto which is of less width than the head member 11 and which forms the shank member of the stud fastener. The shank portion 15 comprises a free end of the strip and therefore may be provided in any necessary length depending on the length of shank desired in the completed fastener.

Figure 6:
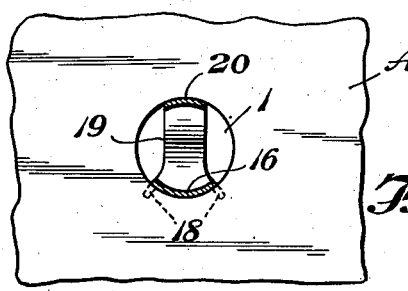
Fig. 6 is a sectional view of Fig. 4, taken on line 6—6 looking in the direction of the arrows.

The strip portion 15, accordingly, defines a load carrying shank member 16 of any desired length and a return bent spring arm shank member 20 extending in spaced, slightly diverging relation to said shank member 16 when normally untensioned. The extremity of the spring arm shank member 16 is bent angularly inwardly toward the shank member 20 to define an inwardly offset abutment 21 terminating adjacent the head member 11, substantially as shown in Fig. 2. Preferably, the shank members 16 and 20 are formed in the manner of outwardly curved longitudinal corrugations or axially extending, channel-shaped shank elements having a rounded or arcuate outer contour conforming generally to the contour of the circular panel opening 1 for most effective bearing engagement with the edges thereof as seen in Fig. 6. The corrugated formation of the shank members 16, 20 otherwise serves to stiffen and rigidify said shank members to withstand any compressive or other force which might possibly cause the same to become deformed or distored either during the application thereof to fastening position or as a result of heavy duty and rough handling over a long period of service and use in a completed installation.

The load carrying shank member 16 is provided with a series of shoulders extending longitudinally thereof and any of which are adapted to provide a securing action in the opening in the panel. Such shoulders preferably are provided in the manner of series of teeth 18 extending along the longitudinal edges of the shank member 16. In the present example, the teeth 18 are provided by a series of spaced transverse slits on each longitudinal edge of the shank member 16. The metal adjacent each slit is bent outwardly out of the plane of said shank member in a manner whereby the point formed by the slit defines an outwardly projecting tooth. The series of teeth on each longitudinal edge of the shank member 16 are equally spaced to provide a series of laterally opposed pairs of teeth extending longitudinally of the shank member 16 and which cooperate in securing said shank member at spaced points in the panel opening. The series of laterally opposed pairs of teeth, accordingly, are so arranged axially of the shank member 16 that any pair is adapted to provide the desired securing action in the panel opening 1 depending on the thickness of secured parts A, B, C, of the installation.

Figure 4:
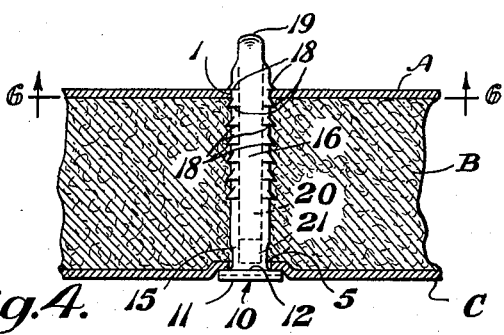
Fig. 4 is a sectional view of an installation as secured by the snap stud fastener of the invention shown in side elevation.
Figure 5:
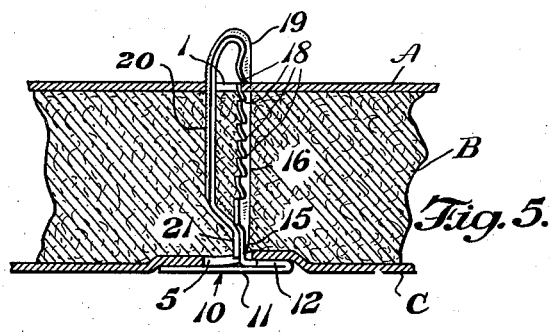
Fig. 5 is a sectional view similar to Fig. 4 with the fastener shown in edge elevation.

The shank of the snap stud fastener thus provided is accordingly defined by the U-shaped shank members 16 and 20 which at the leading end of the shank are so spaced as to define a blunt point or pilot 19 of a size just small enough to be readily received in the panel opening 1. When normally untensioned, said shank members 16, 20 diverge from the pilot 19 in a gradually increasing spaced relation greater than the size of said panel opening 1. Accordingly, in the application of the snap stud to secure an installation such as shown in Figs. 4 and 5, the blunt point 19 or leading end of the fastener is passed through the passage 5 in the trim material C, and through the relatively soft, porous layer of insulation B until said blunt point 19 is received in the panel opening 1. The fastener is then advanced to final applied position by exerting suitable pressure on the head member 11 to compress the trim material C and insulation B as the leading end of the shank is forced through the panel opening 1.

As pressure is exerted on the head member 11, the shank members 16, 20 at the leading end of the fastener cam against the walls of the panel opening 1 in a manner whereby the spring arm shank member 20 is compressed from its initial untensioned diverging relation to the shank member 16, as shown in Fig. 2, to a generally parallel relation thereto as seen in Fig. 5. The compression of the shank member 20 toward the shank member 16 is limited by the offset abutment 21 in engagement with the shank member 16 to maintain said shank members in a predetermined spacing in which said shank members are constantly compressed by the edges of the panel opening and are thereby seated in the panel opening under continuously effective spring tension. Inasmuch as the shank members 16, 20, are formed in the manner of longitudinal corrugations which stiffen and rigidify the same, said shank members easily withstand the aforesaid compressive forces and are otherwise firmly and rigidly disposed in engagement with opposing edge portions of the panel opening. Moreover, the outer rounded shape of said shank members, conforming to the contour of the panel opening, is such as to seat said shank members in uniform bearing engagement with the edge portions of the panel opening as shown in Fig. 6.

Figure 7:
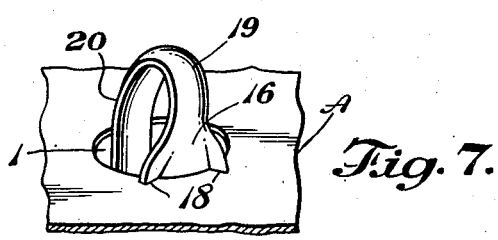
Fig. 7 is a top fragmentary perspective view of Fig. 4 showing the securing action provided by the leading end portion of the fastener.

In this relation, the teeth 18 on the shank member 16 projecting outwardly out of the plane thereof, are adapted to lock the snap stud in fully applied position. Any pair of laterally opposed teeth 18 is adapted to secure the stud in applied position as determined by the combined thickness of the parts of the installation such that when the stud is pushed completely home, the pair of teeth 18 just clearing the panel opening 1 is the effective pair of teeth locking the stud in applied fastening position. In the present example, the installation is shown secured by the first pair of laterally opposed teeth 18 adjacent the pilot 19 as illustrated in Figs. 6 and 7. The outwardly projecting relation of said teeth is such that they engage substantial marginal portions of the panel A adjacent the opening 1 and at spaced points which prevents any tilting or other movement of the shank which might tend to displace or dislodge the fastener from fully applied fastening position. The teeth otherwise are maintained positively in such locking relation with the panel A, Fig. 7, by the outward expansive force of the shank members 16, 20 in compressed relation in the panel opening, as aforesaid.

It will be understood that when the combined thickness of the parts secured is less than that shown in Figs. 4 and 5, the leading end of the fastener projects beyond the panel A a proportionately greater amount in which event the pair of laterally opposed teeth 18 just clearing the panel opening are effective to lock the fastener in securing position. In any case, the application of the fastener is easily and quickly effected by an axial thrust-like motion imparted to the snap stud by pressure exerted on the head member 11, whereupon the pairs of laterally opposed teeth 18 ratchet over the edge of the panel opening until the parts of the installation are suitably clamped by the head member 11 against the panel A. In this position the pair of laterally opposed teeth just clearing the panel opening lock the snap stud in fully applied fastening position firmly and rigidly securing the parts of the installation under constant spring tension, as aforesaid.

Upon removal of pressure from the head member 11 of the stud, the compressed insulation material B naturally attempts to assume its initial condition and thus exerts an axial drawing action on the shank of the fastener such that, in this respect, the pair of teeth 18 engaging the marginal portions of the panel opening are maintained in positive locked relation in the opening, and with the layer of insulation firmly secured to the supporting panel A in a tight, rigid connection which is not subject to loosening or displacement incident to vibration or shock taking place in the operation of the automobile or other structure in which the described installation may be employed.

It is to be noted that the leading end or pilot 19 of the fastener extends only a relatively slight amount beyond the reverse side of the dash panel or other supporting panel A such that there is no objectionable projecting portion which might become entangled with ignition wires, etc., beneath the hood. In the event that it becomes necessary or desirable to remove the fastener, this is easily effected from the rear of the panel A simply by compressing the shank members 16 and 20 toward each other until the pair of engaged teeth 18 disengage the marginal portions of the panel opening and lie within the outline thereof as necessary to permit the shank to be withdrawn in a direction reverse to that in which the fastener was applied.

Figure 8:
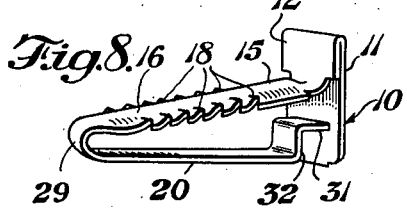
Fig. 8 is a perspective view of an alternate form of the improved snap stud fastener.
Figure 9:
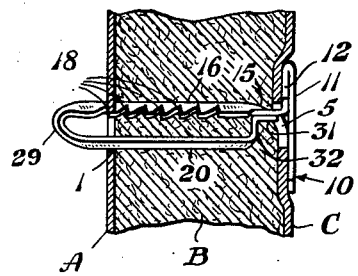
Fig. 9 is a sectional view of an installation similar to Fig. 5 as secured by the form of the fastener shown in Fig. 8.

Figs. 8 and 9 show an alternate form of the fastener which is generally similar in application and use to that described with reference to Figs. 1-7 inclusive. In this form of the invention the shank members 16, 20, approximate a generally parallel and spaced relation in applied fastening position as shown in Fig. 9 and define a somewhat more blunt pilot portion 29. The extremity of the resilient shank member 20 is provided with a more pronounced offset abutment 31 by means of an inwardly bent portion 32 disposed generally normal to said shank member 20 and which maintains the shank members 16, 20, in predetermined spaced relation and provided with increased stiffness and rigidity in order to withstand greater compressive forces in the application of the snap stud to applied fastening position, as aforesaid.

It will be understood that in any case, the shank of the fastener is substantially rigid and can be provided in practically any required length without affecting the efficiency thereof or the effectiveness of its holding action in an installation. The fastener is therefore admirably suited for use in fastening relatively thick parts in an installation, and is particularly effective in securing material such as insulation pads and trim material to the dash panel of an automobile separating the body of the vehicle from the space in which the motor is located beneath the hood. Although the several forms of the invention are disclosed in connection with such an automobile dash installation, it is to be understood that the present invention fully contemplates the use of the improved snap studs in any related or equivalent type of construction.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A snap stud fastener adapted to be secured in an aperture in a supporting part in substantial locking engagement therewith, comprising, a strip of sheet metal bent to provide a pair of spaced shank members of unequal length united at the leading end of the fastener and extending in the same general direction in opposing face to face relation, the longer shank member having a head and the shorter shank member terminating below said head, said shorter shank member having its free end portion bent inwardly toward the longer shank member and then upwardly toward said head of the fastener to provide an axially extending inwardly offset abutment for engaging the inner face of the longer shank member to maintain the intermediate portions of said shank members in a substantially parallel and spaced relation greater than the size of said aperture, whereby said substantially parallel and spaced intermediate portions of said shank members must be compressed toward each other to be received in the aperture in the supporting part and engage opposing walls of said aperture under expansive force, and one of said shank members being provided with a series of shoulders on its intermediate portion extending axially thereof, said shoulders facing said head of the fastener and being engageable with a marginal portion of said aperture under said expansive force of said intermediate portions of the shank members to lock the same in said aperture.

2. A snap stud fastener adapted to be secured in an aperture in a supporting part in substantial locking engagement therewith, comprising, a strip of sheet metal bent to provide a pair of spaced shank members of unequal length united at the leading end of the fastener and extending in the same general direction in opposing face to face relation, said shank members being corrugated longitudinally in outwardly curved channel-shaped form to stiffen the same, the longer shank member having a head and the shorter shank member terminating below said head, said shorter shank member having its free end portion bent inwardly toward the longer shank member and then upwardly toward said head of the fastener to provide an axially extending inwardly offset abutment for engaging the inner face of the longer shank member to maintain the intermediate portions of said shank members in a substantially parallel and spaced relation greater than the size of said aperture, whereby said substantially parallel and spaced intermediate portions of said shank members must be compressed toward each other to be received in the aperture in the supporting part and engage opposing walls of said aperture under expansive force, and one of said shank members having its intermediate portion providing with series of teeth on its longitudinal edges defining pairs of laterally opposite cooperating teeth extending axially of the shank member and engageable with a marginal portion of said aperture under said expansive force of said intermediate portions of the shank members to lock the same in said aperture.

RICHARD A. HARTMAN.

REFERENCES CITED

The following references are of record in the file of this patent:

UNITED STATES PATENTS

| Number | Name | Date |
| --- | --- | --- |
| 2,077,120 | Lombard | Apr. 13, 1937 |
| 2,100,017 | Van Uum | Nov. 23, 1937 |
| 2,103,955 | Place | Dec. 28, 1937 |
| 2,138,195 | Place | Nov. 29, 1938 |
| 2,164,014 | Jones | June 27, 1939 |
| 2,191,412 | Pihl | Feb. 20, 1940 |
| 2,198,186 | Tinnerman | Apr. 23, 1940 |
| 2,229,996 | Churchill | Jan. 28, 1941 |
| 2,291,847 | Taylor | Aug. 4, 1942 |
| 2,428,338 | Poupitch | Sept. 30, 1947 |